United States Patent [19]

Hamann et al.

[11] 4,302,478
[45] Nov. 24, 1981

[54] METHOD OF SHAPING POTATO DOUGH

[75] Inventors: Michael L. Hamann; Nicholas C. Guidinger, both of Caldwell; Wayland I. Fisher, Boise, all of Id.

[73] Assignee: J. R. Simplot Company, Boise, Id.

[21] Appl. No.: 157,252

[22] Filed: Jun. 9, 1980

[51] Int. Cl.³ .......................... A23L 1/216; A23P 1/00
[52] U.S. Cl. ...................................... 426/517; 425/362; 425/367; 425/373; 425/437; 426/637
[58] Field of Search ............... 426/389, 503, 512, 517, 426/637; 425/362, 367, 369, 370, 373, 437; 264/175

[56] References Cited

U.S. PATENT DOCUMENTS

| 1,724,827 | 8/1929 | Costello | 425/362 |
| 2,167,388 | 7/1939 | Kremmling | 425/362 X |
| 2,608,939 | 9/1952 | Naylor | 425/367 X |
| 2,695,571 | 11/1954 | Kalmeijer | 425/362 X |
| 3,085,020 | 4/1963 | Backinger et al. | 426/637 |
| 3,318,264 | 5/1967 | Weidenmiller | 425/362 |
| 3,589,308 | 6/1971 | Verhoeven | 425/373 X |
| 3,748,073 | 7/1973 | Lankford et al. | 425/367 X |
| 3,764,345 | 10/1973 | Beck et al. | 426/517 X |
| 3,935,322 | 1/1976 | Weiss et al. | 426/503 X |
| 3,968,265 | 7/1976 | Shatila et al. | 426/637 X |
| 4,059,378 | 11/1977 | Sollich | 425/362 |
| 4,082,855 | 4/1978 | Citti et al. | 426/637 X |
| 4,135,004 | 1/1979 | Finkel | 426/637 X |
| 4,156,744 | 5/1979 | Kiploks et al. | 426/637 |
| 4,212,609 | 7/1980 | Fay | 425/362 X |

*Primary Examiner*—Arthur L. Corbin
*Attorney, Agent, or Firm*—Fulwider, Patton, Rieber, Lee & Utecht

[57] ABSTRACT

A method of shaping potato dough into elongated strips comprises feeding a mass of dough from a hopper between a feed roller and a parallel die roller of a continuous rotary shaper. The feed roller forces the dough into annular channels in the die roller to form a plurality of dough strips. The dough strips are continuously released from the die roller onto a conveyor belt driven by an adjustable pressure roller in direct rolling pressure commnication with the die roller.

22 Claims, 4 Drawing Figures

U.S. Patent     Nov. 24, 1981     4,302,478
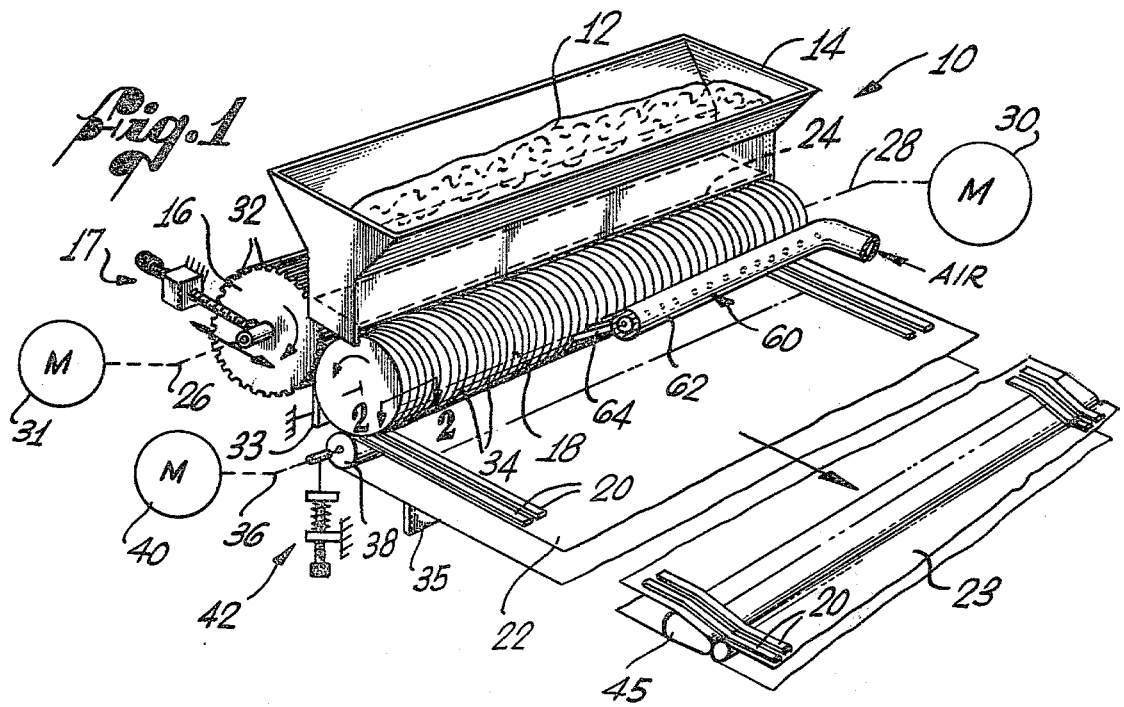
Fig. 1
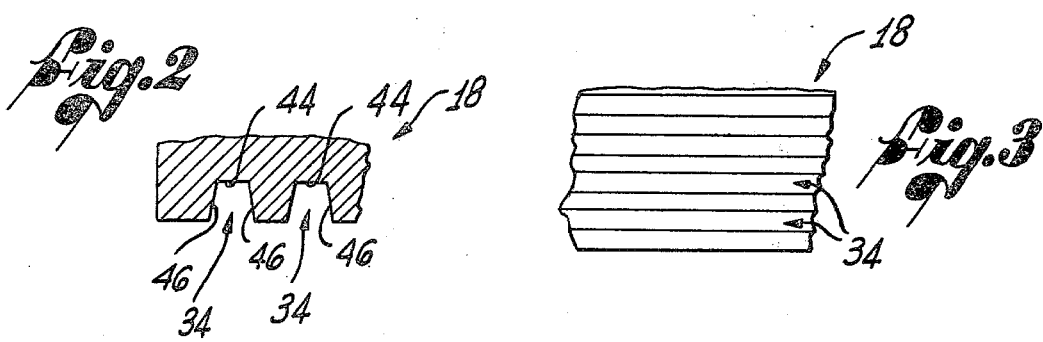
Fig. 2
Fig. 3
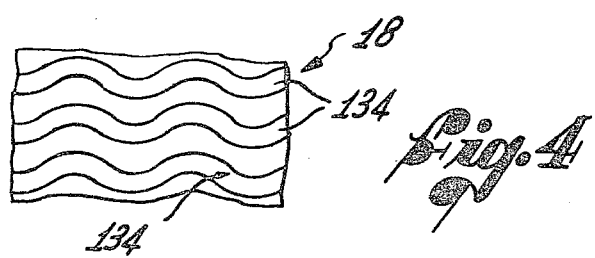
Fig. 4

METHOD OF SHAPING POTATO DOUGH

BACKGROUND OF THE INVENTION

This invention relates to an improved method for shaping potato dough into continuous strips for subsequent processing such as cutting, cooking, and the like. More specifically, this invention relates to a method of continuously forming potato dough into strips using a rotary shaper device.

French fried potatoes comprise a popular consumer food item. In one common form, these potatoes are sold as frozen strips of parfried natural potato for finish cooking by the purchaser prior to consumption. However, the use of natural strips of potato has several disadvantages in that the natural potatoes must be perfectly peeled and sliced to exclude peel and dark areas for proper consumer acceptance. However, the provision of potato strips in this form results in wasting a substantial portion of the potato to increase correspondingly the cost of the product supplied to the consumer. To this end, there has been a variety of attempts to prepare potato products in strip form from a potato dough wherein the end product is intended to closely simulate natural potato strips. This potato dough typically includes, at least in part, dehydrated potato components such as potato flakes and/or potato granules.

In the prior art, significant production problems have been encountered in the conversion of a potato dough into elongated dough strips for subsequent cutting to simulate natural potatoes. One common process comprises forcing the potato dough through an extrusion die to form an elongated continuous dough strip. See, for example, U.S. Pat. Nos. 3,085,020; 3,968,265; 4,082,855; and 4,135,004. However, extrusion processes place the dough under substantial pressure, which acts to reduce the fluffiness of the dough. This reduction in dough fluffiness correspondingly results in an end product which, when cooked, has a less desirable and pasty texture when compared with a fluffier dough product. Moreover, extrusion processes frequently encounter feathering of the dough as it is forced through the extrusion die to result in a dough strip having an unnatural-appearing exterior surface. Accordingly, prior art extrusion-forming processes for potato dough have produced a finish product which is less than satisfactory when compared with natural potato strips.

The process of this invention comprises an improved method for shaping potato dough into continuous dough strips for subsequent processing. The method comprises a rotary forming method which does not substantially compress the dough, and which does not encounter feathering problems.

SUMMARY OF THE INVENTION

In accordance with the invention, a method of shaping potato dough comprises feeding a mass of dough downwardly into a rotary shaper having parallel elongated feed and die rollers. The dough is fed generally between the feed and die rollers, and is forced by outwardly radiating teeth on the feed roller into annular forming channels in the die roller to convert the dough into a plurality of dough strips. These dough strips are released from the channels as continuous dough strips onto a conveyor belt positioned under pressure in direct rolling contact with the die roller and the strips by means of an adjustable pressure roller. In one form of the invention, the conveyor belt is arranged to be driven by virtue of its rolling contact with the die roller, whereas in another embodiment the conveyor belt is separately driven by the pressure roller. If desired, air jets can be directed into the channels to assist release of the dough strips from the channels.

BRIEF DESCRIPTION OF THE DRAWINGS

The accompanying drawings illustrate the method of this invention. In such drawings:

FIG. 1 is a perspective view illustrating a rotary shaper used in the method of this invention;

FIG. 2 is an enlarged horizontal section taken on the line 2—2 of FIG. 1;

FIG. 3 is an enlarged portion of the rotary shaper illustrating one form of a die; and FIG. 4 is an enlarged portion of a rotary shaper illustrating another form of a die roller.

DETAILED DESCRIPTION OF THE PREFERRED EMBODIMENT

The method of this invention is illustrated by operation of a rotary shaper 10 shown generally in FIG. 1. As shown, a mass of potato dough 12 is supplied to a hopper 14 for passage into communication with a feed roller 16 and a die roller 18 of the rotary shaper 10. The feed and die rollers 16 and 18 operate to convert the mass of dough 12 into a plurality of precisely-formed potato dough strips 20. These dough strips 20 are supplied to a conveyor belt 22 which carries the dough strips 20 away from the rotary shaper 10 for subsequent processing such as cutting and parfrying. Since these subsequent processing steps in general terms are known in the art, they are not described in detail herein. However, for a description of one preferred cutting assembly and arrangement, see U.S. patent application Ser. No. 157,251, filed concurrently herewith in the name of Willaim E. Martin et al.

The hopper 14 is positioned generally above the rotary shaper 10 and includes an elongated lower slot 24 through which the dough mass 12 is fed. This slot 24 is sized and shaped generally to correspond with the longitudinal length of the feed and die rollers 16 and 18, and is positioned to feed the dough mass generally between the feed roller 16 and the die roller 18. In operation, it is desirable to form the slot 24 to have an open dough passage area sufficient to allow the dough mass 12 to pass continuously and substantially evenly through the slot 24 by virtue of its own weight. This avoids the use of substantial extrusion pressures as commonly used in the prior art, whereby the dough mass retains its fluffiness to result in an improved consumer product.

The feed roller 16 and the die roller 18 comprise a pair of cylindrical members formed from a suitable machinable, but relatively wear resistant material, and are constrained for respective rotation about a pair of parallel axes 26 and 28. The feed roller 16 includes an adjustment assembly 17 to allow for shifting of the feed roller axis 26 toward and away from the die roller axis 28, in accordance with the specific physical characteristics of the dough 12 as will be described in more detail. In practice, adjustment of the feed roller axis 26 allows the feed roller 16 to be moved between rolling contact with the die roller 18, and a position spaced in parallel from the die roller 18 by a distance of say about one inch.

A variable speed electric motor 30 is provided for rotatably driving the die roller 18 in a counterclockwise direction. A second variable speed electric motor 31 is provided for driving the feed roller 16 in a clockwise direction. In this manner, the two rollers 16 and 18 together rotate to draw the dough mass 12 downwardly between the rollers 16 and 18. Of course, if desired, the second electric motor 31 can be eliminated, and the feed roller 16 can be driven by the motor 30 through appropriate gearing mechanisms.

The feed roller 16 includes about its circumference a plurality of outwardly radiating teeth 32. These teeth 32 extend axially for the length of the feed roller 16 for close communication with the die roller 18. In turn, the shaping roller 18 includes a plurality of axially spaced channels 34 which each extend annularly about the circumference of the die roller 18.

In operation, when the die roller 18 is drivingly rotated by the motor 30, the teeth 32 of the feed roller 16 function to force the mass of dough 12 into the channels 34 in the die roller 18. The mass of dough is thereby converted into the shape of the strips 20 without substantial compression of the dough, and without undergoing any extrusion process. Further rotation of the die roller 18 moves the thus-formed strips in the channels 34 downwardly and away from the teeth 32 of the feed roller 16, and toward the conveyor belt 22.

The spacing between the feed roller 16 and the die roller 18, together with the speed of rotation of the feed roller 16 with respect to the die roller 18 are chosen according to the physical characteristics of the dough 12. In a typical operation, the spacing is chosen to be about one-sixteenth to one-eighth inch, and the feed roller 16 is rotated on the order of about one-half the rotational speed of the die roller 18. With these parameters, the teeth 32 of the feed roller 16 satisfactorily force the dough 12 into the channels 34 to form the dough strips. If an increased density is desired for the dough strips, the spacing is decreased and the feed roller rotational speed is increased.

A stripper knife 33 is positioned generally below the feed roller 16 and the die roller 18, and above the conveyor belt 22, to scrape excess dough off the die roller 18. Specifically, the stripper knife 33 extends transversly the width of the die roller in scraping contact with the roller periphery. The stripper knife 33 removes excess dough from the roller 18, and this dough suitably falls to an appropriate bin (not shown) for collection and subsequent return to the hopper 14.

An adjustable pressure roller 38 is positioned directly below the die roller 18 for rotation about a horizontal axis 36 generally in parallel with the axes 26 and 28 of the feed and die rollers. The pressure roller 38 is spaced from contact with the feed roller 16 so as to avoid rolling contact therewith. However, the pressure roller 38 is disposed in a position for rolling communication with the die roller 18. The conveyor belt 22 is received about the pressure roller 38, and is thus positioned by the pressure roller 38 in rolling contact with the lower extent of the die roller 18.

The formed strips 20 of potato dough within the channels 34 of the shaping roller 18 are rotated downwardly into direct rolling contact with the conveyor belt 22. These strips 20 release without feathering from their associated channels 34 directly onto the conveyor belt 22 as a plurality of elongated, continuous potato dough strips. As described above, these strips 20 are carried by the conveyor belt away from the rotary shaper 10 for subsequent processing. Conveniently, as shown in FIG. 1, a scraper blade 35 is provided for scraping any excess dough from the belt 22 prior to return of the belt from a subsequent processing station (not shown) for communication with the shaping roller 18.

Release of the dough strips 20 from the roller channels 34 to the conveyor belt 22 is affected by the pressure between the die roller 18 and the conveyor belt 22 and pressure roller 38, together with the speed of travel of the conveyor belt with respect to the die roller 18. Specifically, the pressure roller 38 is carried by a pressure adjustment assembly 42 for moving the pressure roller 38 toward and away from the die roller 18, thereby varying the pressure applied to the die roller. Preferably, the pressure roller 38 is formed from a relatively stiff rubber, say about sixty durometer, and is moved into pressure communication with the die roller 18 with a force of several thousand pounds to compress the pressure roller by say about one-eighth to about one-quarter inch. In this manner, the dough strips 20 have been found to release readily from the channels 34 promptly upon release of the substantial pressure applied thereto as the strips are rotated in communication with the conveyor belt past the line of pressure communication with the pressure roller 38.

The speed of rotation of the pressure roller 38 is chosen to match as closely as possible the speed of rotation of the die roller 18. In one embodiment, the pressure between the conveyor belt 22 and the die roller 18 is utilized to drive frictionally the belt 22 and the pressure roller 38. In another embodiment, in recognition of possible slippage between the belt 22 and the die roller 18, a separate electric motor 40 including suitable speed range control is provided for separately driving the pressure roller 38 and the conveyor belt 22 to assure a precise speed matching between the belt and the shaping roller.

The conveyor belt 22 is chosen to comprise a material which tends to stick slightly with the dough to enhance release of the dough strips 20 from the channels 34. In a preferred embodiment, the belt 22 is formed from a canvas such as two ply woven cotton, although other materials can be used.

An air manifold 60 can also be provided to enhance release of the dough strips 20 from the channels 34. As illustrated in FIG. 1, this manifold 60 comprises a conduit 62 extending transversely in front of the die roller 18 above the conveyor belt 22. The conduit includes nozzles 64 aligned with individual ones of the channels 34, and these nozzles direct jets of air rearwardly and downwardly into these channels at a point slightly above the conveyor belt 22. When a sticky dough 12 is used, these air jets improve release of the dough strips 20 from the channels. While the specific air flow and pressure is dependent upon the physical characteristics of the dough, one-sixteenth inch nozzles supplied with air at sixty pounds per square inch pressure have been satisfactorily used in a typical installation.

As shown in FIGS. 2 and 3, the channels 34 of the die roller 18 are formed linearly to form straight shaped strips 20 of potato dough which release easily from the channels. More specifically, the channels 34 each comprise a straight annular channel extending about the die roller 18 and having a generally rectangular cross section with a base 44 and generally upstanding side walls 46. For easy release of the dough strips 20 from the channels, these side walls 46 are each formed at an angle slightly greater than 90° with respect to the base 44. For example, an angular relationship between each side wall 46 and the base 44 is at least about 91°, although this angular relationship is exaggerated in FIG. 2 for purposes of clarity. With this channel configuration, it has been found that a fluffy potato dough releases easily and efficiently from the channels 34 onto the conveyor belt 22.

An alternate shaping of the channels formed in the die roller 18 is illustrated in FIG. 4. As shown, a plurality of alternate channels 134 are formed to have a wavy configuration for use in producing dough strips with a so-called "crinkle cut" shape. Once again, the channels 134 of FIG. 4 are desirably formed to have a cross section generally as shown and described with respect to FIG. 2.

The operation of the method of the invention is generally as follows. The dough mass 12 is placed into the hopper 14 from where it falls under its own weight through the slot 24 between the feed roller 16 and the die roller 18. The teeth 32 on the roller 16 urge the dough into a plurality of channels 34 formed in the die roller 18 to yield a plurality of dough strips 20. These dough strips 20 are carried downwardly between the rollers 16 and 18 into direct rolling contact and pressure with the conveyor belt 22. The dough strips 20 release from the channels 34 onto the belt 22 for movement away from the rotary shaper 10 for subsequent processing. Conveniently, the downstream end of the conveyor belt 22 includes a downwardly angled bull nose-type support 45 for easy release of the strips 20 from the belt 22 for passage to a subsequent conveyor belt 23.

It has been found that the composition of the dough also has an effect upon the ability of the dough to release from the channels 34 during forming. For one preferred dough composition, see U.S. patent application Ser. No. 157,257, filed concurrently herewith in the name of Michael L. Hamann et al. For example, it has been found that inclusions of an oil such as animal or vegetable oil in an appropriate small amount substantially improves dough release from the channels 34. The absence of oil in the dough composition, or alternately, an excessive quantity of oil results in an unsatisfactory product. It has been found the the composition should include oil in an amount by weight up to about 4.0 percent, with about 0.25 percent to about 0.50 percent being preferred. Moreover, excellent release of the dough from the channels has been obtained when the dough and the rotary shaper 10 are maintained within a preferred temperature range. This preferred range is on the order of from about 65° F. to about 130° F., and preferably about 100° F. Temperatures outside this range have been found to create a tendency of the dough to stick to components of the rotary shaper 10 so as to impair proper release of the dough strips onto the conveyor belt 22. The dough should also have a moisture content of about 62-74 percent by weight.

A variety of modifications to the method disclosed in this application are believed to be apparent to one skilled in the art. Accordingly, no limitation upon the invention is intended except as set forth in the appended claims.

What is claimed is:

1. A method of shaping potato dough into elongated strips for use in simulating strips of natural potato, comprising the steps of:

forming a mass of potato dough, having a moisture content of about 62-74 percent by weight, to include edible oil in an amount by weight up to about 4.0 percent;

feeding the dough into a rotary shaper having a feed roller with axially extending teeth positioned for rotation in close parallel relation with a rotatable die roller having a plurality of continuous annular channels formed therein;

rotatably driving the feed and die rollers in a direction to draw the mass of dough between the rollers so that the teeth of the feed roller force the dough into the channels of the die roller to convert the mass of dough into a plurality of dough strips; and passing a conveyor belt in rolling pressure contact with the die roller and the dough strips in the channels for release of the dough strips from the channels onto the conveyor belt.

2. The method of claim 1 wherein said feeding step comprises positioning a hopper generally above the rotary shaper, and feeding the mass dough from the hopper downwardly between the feed and die rollers.

3. The method of claim 2 wherein the hopper includes a lower slot aligned generally for passage of the mass of dough between the feed and die rollers, and wherein said feeding step comprises allowing the mass of dough to fall through the slot under its own weight.

4. The method of claim 2 wherein said step of passing the conveyor belt comprises passing the belt in a generally horizontal direction in rolling contact generally with the lower extent of the die roller.

5. The method of claim 1 wherein said driving step comprises rotatably driving the feed and die rollers at independent speeds with respect to each other.

6. The method of claim 5 including means for positioning the conveyor belt under pressure in rolling contact with the die roller, said driving of the die roller serving also to drive the conveyor belt.

7. The method of claim 5 including the additional step of driving the conveyor belt at a controlled speed for passage in rolling pressure contact with the die roller.

8. The method of claim 1 including the step of adjustably setting the pressure of rolling contact between the die roller and the conveyor belt with an adjustable pressure roller in direct pressure communication with the die roller.

9. The method of claim 1 including the step of forming the channels each to have a generally straight configuration extending annularly about the die roller, and to be defined by a channel base and a pair of side walls each extending radially outwardly from the base at an angle slightly greater than ninety degrees.

10. The method of claim 1 including the step of forming the channels each to have a generally wavy configuration extending annularly about the die roller, and to be defined by a channel base and a pair of side walls each extending radially outwardly from the base at an angle slightly greater than ninety degrees.

11. The method of claim 1 including the steps of adjusting the rotational speed of the feed roller with respect to the die roller and adjusting the spacing between the feed roller and the die roller.

12. The method of claim 1 including improving the release of the dough strips from the channels by directing jets of air into the channels at a position slightly above the conveyor belt.

13. The method of claim 1 including forming the conveyor belt from a cotton-base fabric.

14. The method of claim 1 including stripping excess dough from the die roller after the dough is forced into the channels and before pressure contact of the dough strips with the conveyor belt.

15. The method of claim 1 wherein said dough forming step comprises forming the dough to include edible oil in an amount by weight of from about 0.25 percent to about 0.50 percent.

16. A method of shaping potato dough into elongated strips for use in simulating strips of natural potato, comprising the steps of:
forming a mass of potato dough, having a moisture content of about 62–74 percent by weight, to include edible oil in an amount by weight up to about 4.0 percent;
feeding the dough from a hopper generally downwardly into a rotary shaper having a feed roller and a die roller mounted on parallel generally horizontal axes for rotation with respect to each other;
forming the feed roller to have a plurality of axially extending, radially outwardly projecting teeth;
forming the die roller to have a plurality of axially spaced, continuous annular channels;
adjusting the position of the feed roller with respect to the die roller;
rotatably driving the feed and die rollers at respectively controlled speeds to draw the mass of dough downwardly between the rollers and to cause the feed roller teeth to force the dough into the die roller channels and thereby convert the mass of dough into a plurality of dough strips; and
moving a conveyor belt at a controlled speed in rolling and adjustable pressure contact relation with the die roller generally at the lower extent thereof for direct pressure contact with the dough strips in the channels for release of the dough strips directly from the channels onto the conveyor belt.

17. The method of claim 16 wherein said conveyor belt moving step comprises passing the conveyor belt about a pressure roller rotatable about an axis parallel with the axis of the die roller, and adjustably positioning the pressure roller with respect to the die roller into pressure communication with the die roller to bring the conveyor belt into direct rolling pressure contact at a selected pressure with the die roller.

18. The method of claim 17 wherein said moving step further includes rotatably driving the pressure roller at a controlled speed with respect to the rotational speed of the die roller.

19. The method of claim 1 or 16 wherein said feeding step comprises feeding the mass of dough at a temperature within the range of from about 65° F. to about 130° F.

20. The method of claim 1 or 16 including the step of maintaining the rotary shaper and the mass of dough within a temperature range of from about 65° F. to about 130° F.

21. The method of claim 16 including improving the release of the dough strips from the channels by directing jets of air into the channels at a position slightly above the conveyor belt.

22. The method of claim 16 including forming the dough to include edible oil in an amount by weight of from about 0.25 percent to about 0.50 percent.

* * * * *